(12) United States Patent
Strayn et al.

(10) Patent No.: US 11,479,183 B1
(45) Date of Patent: Oct. 25, 2022

(54) VARIABLE WIDTH HOLDER DEVICE

(71) Applicants: John David Strayn, Shalimar, FL (US); Michael Shane Holloway, Snead's Ferry, NC (US)

(72) Inventors: John David Strayn, Shalimar, FL (US); Michael Shane Holloway, Snead's Ferry, NC (US)

( * ) Notice: Subject to any disclaimer, the term of this patent is extended or adjusted under 35 U.S.C. 154(b) by 0 days.

(21) Appl. No.: 17/834,712

(22) Filed: Jun. 7, 2022

(51) Int. Cl.
B60R 11/02 (2006.01)
B60R 11/00 (2006.01)

(52) U.S. Cl.
CPC ....... B60R 11/02 (2013.01); *B60R 2011/0003* (2013.01); *B60R 2011/008* (2013.01)

(58) Field of Classification Search
CPC .................................. B60R 11/02; F16M 13/00
USPC ......................... 361/679; 248/346.04, 346.03
See application file for complete search history.

(56) References Cited

U.S. PATENT DOCUMENTS

| | | |
|---|---|---|
| 5,127,615 A | 7/1992 | Jones |
| 6,285,758 B1 | 9/2001 | Lu |
| 7,537,190 B2 * | 5/2009 | Fan ...................... H04B 1/3877 379/426 |
| 8,646,736 B2 * | 2/2014 | Berry ..................... H04M 1/04 361/679.01 |
| 9,655,434 B2 | 5/2017 | Briant et al. |
| 9,746,887 B2 | 8/2017 | Lai |
| 9,776,577 B2 * | 10/2017 | Carnevali ............ F16M 11/041 |
| 9,797,543 B2 * | 10/2017 | Lin ........................ F16M 13/00 |
| 10,663,104 B2 | 5/2020 | Yang |
| 2012/0080577 A1 * | 4/2012 | McIntyre ............. F16M 11/041 248/346.03 |
| 2017/0205851 A1 | 7/2017 | Porzio |
| 2021/0025547 A1 | 1/2021 | Pittman et al. |

OTHER PUBLICATIONS

Computer Tower Stand, CPU Stand for PC Computer Case Holder Bracket Desktop Mainframe Storage Rack with Brake with 4 Caster Wheels(Black), Oct. 15, 20218, 9 pages as prias vies at https://www.amazon.com/Computer-Bracket-Desktop-Mainframe-Storage/dp/B07JVZGF68?th=1nted.

* cited by examiner

*Primary Examiner* — D Glenn Dayoan
*Assistant Examiner* — Sunsurraye Westbrook
(74) *Attorney, Agent, or Firm* — Kevin E Flynn; Flynn IP Law

(57) ABSTRACT

A process for mounting an object within an adjustable device. The adjustable device can in turn be attached to a vehicle to hold the object to the vehicle. This adjustable device may be made larger or smaller to accommodate different sizes of objects. The adjustment of the adjustable device comes from the interaction of a set of one or more ribs on one piece with a set of channels on another piece.

20 Claims, 10 Drawing Sheets

| FIG. 8A |
|---------|
| FIG. 8B |

FIG. 8A

| 1004 | obtain first piece with a set of channels and second piece with a set of ribs that may be top loaded into the channels |
|---|---|

| 1008 | insert bottom of the distal rib of the second piece into a channel located between the proximal channel closest to the sidewall of the first piece and the distal channel furthest from the sidewall of the first piece. |
|---|---|

| 1012 | (optional) apply sufficient force so that the first piece and the second piece are engaged with an interference fit to retain the first piece to the second piece. |
|---|---|

| 1016 | attempt to insert the object into the assembled adjustable device but find that the width of the object is slightly larger than the interior width between the sidewall on the first piece and the sidewall on the second piece |
|---|---|

| 1020 | (optional) apply sufficient force so that the first piece and the second piece are disengaged from the interference fit to retain the first piece to the second piece |
|---|---|

VARIABLE WIDTH HOLDER DEVICE

BACKGROUND

Field of the Disclosure

This disclosure relates generally to adjustable holding devices to hold on object while the object is on a vehicle. The adjustable holding device may be configured to use one of several options for the width of the adjustable holding device so that the adjustable holding device may receive a first object with a first width but at a different time be adjusted to receive a second object with a second width that is different than the first width. The objects are likely to be electronic devices such as telephones, portable GPS devices with map displays, sonar devices, fish finders, activity trackers, tablets, iPads, control panels stations, Amazon Kindle e-readers or analogous devices, photographs, emergency locator beacons, or other electronics with a display screen.

While the present disclosure is well adapted for use on boats, other use cases are viable including but not limited to farm equipment, factory floors, schools, laboratories, sport 4x4 vehicles, and golf carts.

Vocabulary.

A, An.

In this application, and the claims that follow, the terms a, an, or the identification of a single thing should be read as at least one unless such an interpretation is impossible within the context of the entirety of the specification. For example, the use of the terms sole, only, or the phrase not more than one would indicate that a single item is intended.

Gne and Gnes.

To avoid the awkward he/she and his/her or the potentially confusing singular use of they and their, this application uses the gender-neutral pronoun—gne, the possessive pronoun—gnes, reflexive pronoun—gneself and the object form—gnerm.

Or.

Unless explicit to the contrary, the word "or" should be interpreted as an inclusive or rather than an exclusive or. Thus, the default meaning of or should be the same as the more awkward and/or.

Set.

Unless explicit to the contrary, the word "set" should be interpreted as a group of one or more items.

Step.

The term step may be used in descriptions within this disclosure. For purposes of clarity, one distinct act or step may be discussed before beginning the discussion of another distinct act or step. The term step should not be interpreted as implying any particular order among or between various steps disclosed unless the specific order of individual steps is expressly indicated.

Substantially.

Frequently, when describing an industrial process it is useful to note that a given parameter is substantially met. Examples may be substantially parallel, substantially perpendicular, substantially uniform, and substantially flat. In this context, substantially X means that for purposes of this industrial process it is X. So something that may not be absolutely parallel but is for all practical purposes parallel, is substantially parallel. Likewise, mixed air that has substantially uniform temperature would have temperature deviations that were inconsequential for that industrial process.

As recognized in C. E. Equipment Co. v. United States, 13 U. S.P.Q.2d 1363, 1368 (Cl. Ct. 1989), the word "substantially" in patent claims gives rise to some definitional leeway—thus the word "substantially" may prevent avoidance of infringement by minor changes that do not affect the results sought to be accomplished.

Units.

Note that in order to provide focus on specific functions, the description below will reference various "units". In this context, a unit implies the required resources to perform a given set of functions. This may include a combination of electro-mechanical devices such as a microphone or a camera and the processing power to control the devices then manipulate the data obtained by the devices. In some instances, the functionality from several individually discussed units may be performed using physical components that are shared by several of the units discussed below. Unless explicit to the contrary, the word "or" should be interpreted as an inclusive or rather than an exclusive or. Thus, the default meaning of or should be the same as the more awkward and/or.

Vehicle.

The term vehicle is intended to be used broadly to include anything that transports people or cargo. Vehicles include land vehicles such as bicycles, motorcycles, cars, trucks, all-terrain vehicle. Vehicles include all sorts of watercraft including boats, ships, underwater vehicles, jet skis, and other items used on the water. Vehicles includes aircraft of all types including planes, gliders, helicopters, hang gliders, and other vehicles that take flight. Vehicles includes industrial vehicles such as fork lifts, construction equipment, mining equipment, mobile hospital beds, and carts that carry items but do not normally carry people.

Width.

Width is the distance between the sidewall on the first piece and the sidewall on the second piece. As an object may be side loaded into the adjustable device in some uses, the "sidewalls" may become the top and bottom walls retaining the object. In this case, the adjustable distance between walls will still be called the width even though the orientation of the adjustable device has been changed.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

FIG. 8 is divided into two sequential pages, FIG. 8A and FIG. 8B.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
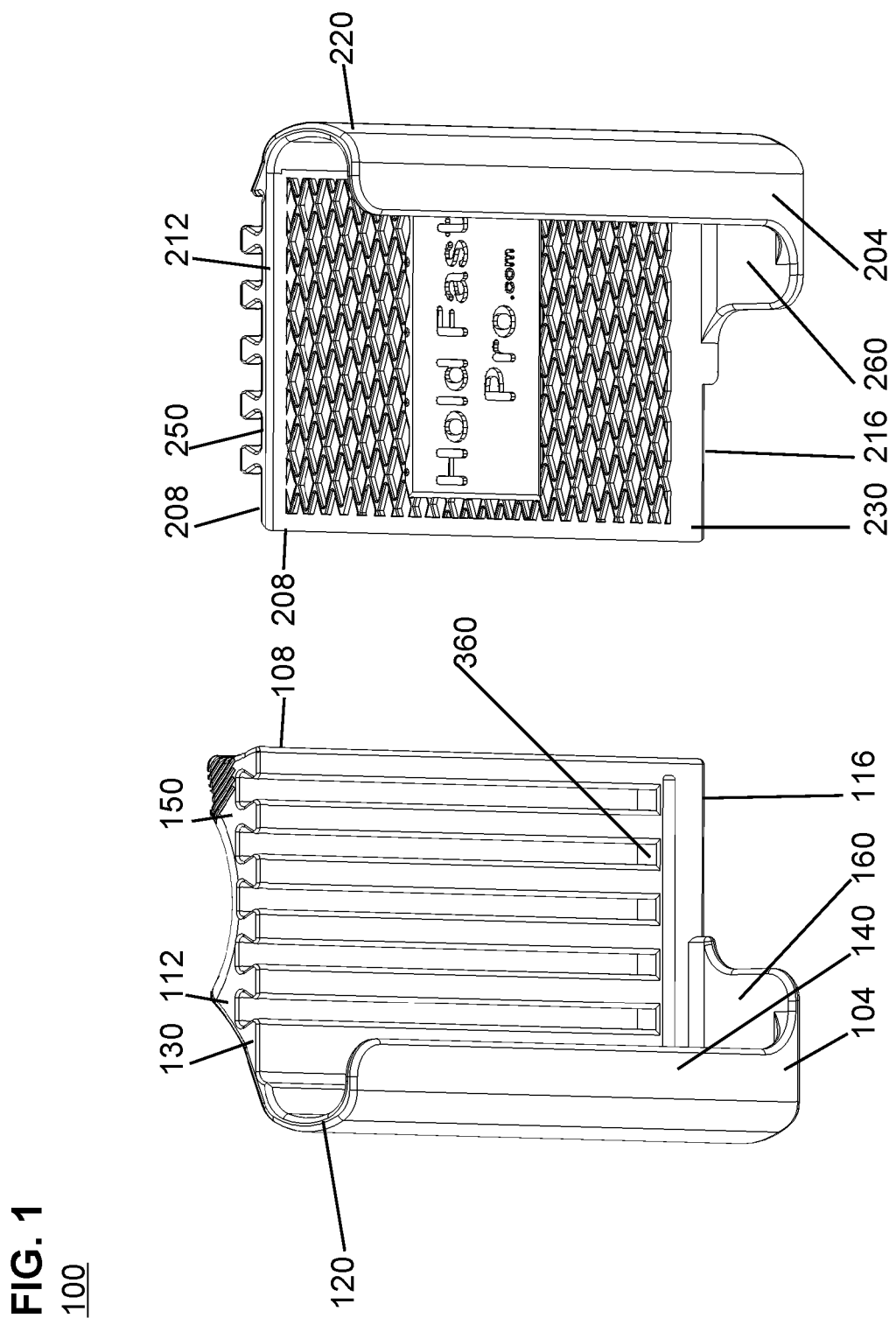
FIG. 1 is a top, front, view of first piece 150 and second piece 250 that form the adjustable device 100.

FIG. 1 is a top, front, view of first piece 150 and second piece 250 that form the adjustable device 100.

First piece 150 has a front side 104, a back side 108, a top side 112 and a bottom side 116. First piece 150 has a side wall 120 on one side. The side wall 120 is connected to a partial back wall 130, a partial front wall 140, and a partial bottom wall 160 that provides support for a portion of the held object (not shown here).

Second piece 250 has a front side 204, a back side 208, a top side 212 and a bottom side 216. Second piece 250 has a side wall 220 on one side. The side wall 220 is connected to a partial back wall 230, a partial front wall 240, and a partial bottom wall 260 that provides support for a portion of the held object (not shown here).

In FIG. 1, the first piece 150 has the side wall 120 on the left side and the second piece 250 has a side wall 220 on the right side. This is not a requirement of the present disclosure. Those of skill in the art would be able to have the first piece 150 which has a closed side wall on the right side and a second piece 250 that has a closed side wall on the left side.

Figure 2:
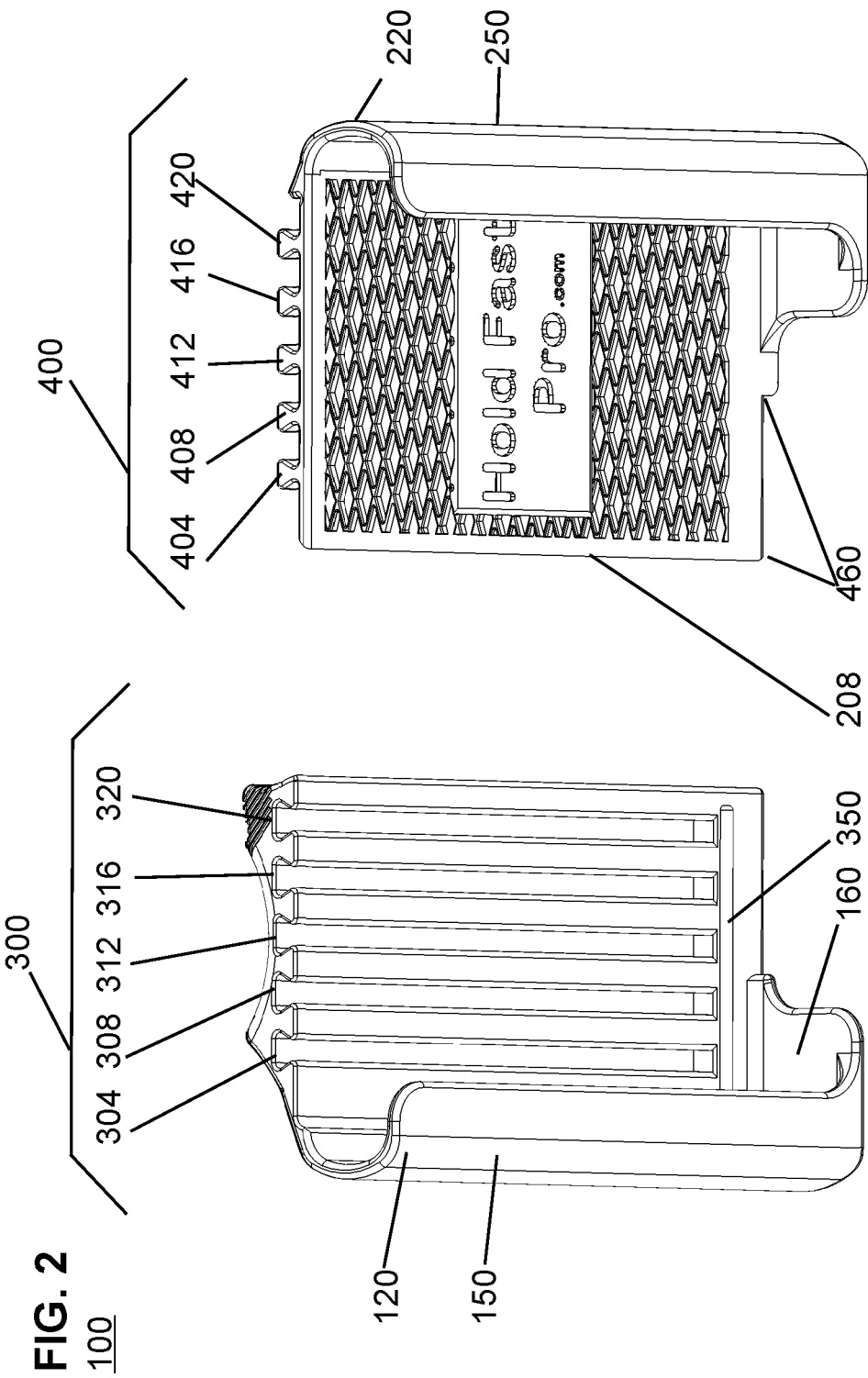
FIG. 2 is a top, front, view of first piece 150 and second piece 250 that form the adjustable device 100.

FIG. 2 is a top, front, view of first piece 150 and second piece 250 that form the adjustable device 100. FIG. 2 is the same view as FIG. 1 but has been included so that FIG. 1 is not overburdened with element numbers.

First piece 150 differs from second piece 250 in several ways. The most apparent difference is that the first piece 150 has a set of channels 300. More specifically, in this instance, five channels 304, 308, 312, 316, and 320. One of skill in the art will appreciate that the set of channels 300 could have any number of channels but would likely to have at least three.

In contrast, the second piece 250 has a set ribs 400. More specifically, in this instance, five ribs 404, 408, 412, 416, and 420.

The ribs 400 are shaped to fit snugly within channels 300 after being top loaded into the set of channels 300. The shape of the channels 300 and ribs 400 is selected so that the ribs 400 are trapped within the channels 300 and cannot be pulled out the open fronts of the channels 300. One well-known shape for the ribs is known as a dove tail but this disclosure is not limited to the use of a dove tail shape for the ribs 400.

Top loading the set of ribs 400 into the set of channels 300 with rib 404 inserted into channel 304 will result in an adjustable device 100 with a first width between the object side of the side wall 120 and the object side of side wall 220.

Top loading the set of ribs 400 into the set of channels 300 with rib 404 inserted into channel 308 rather than channel 304 will result in an adjustable device 100 with a first width between the object side of the side wall 120 and the object side of side wall 220 that is slightly wider than when using channel 304. The adjustable device 100 may be made progressively larger by selecting channel 312 or 316 to receive rib 404. Some designers may prefer to have at least two ribs (rib 404 and rib 408) engage at least two channels (channel 316 and channel 320) in order to provide a desired level of stiffness to the assembled adjustable device 100. Other designers may tolerate a single engagement of rib 404 and channel 320. This decision will be influenced by the geometry of the device and the geometry of the ribs.

One of skill in the art will appreciate that the set of ribs 400 could have any number of channels but would likely to have at least three. One of skill in the art will appreciate that the number of channels 300 would not necessarily be the same as the number of ribs 400 but many designers will choose to have the same number of channels 300 and ribs 400. One of skill in the art will appreciate that a holder intended to receive a tablet or other large device may have more channels 300 and ribs 400 or the adjustable device 100 may have dead bands without channels 300 or ribs 400 for widths of the adjustable device well below any likely width of the held device.

Rib 404 is the rib 400 that is furthest from sidewall 220 of the second piece 250. This rib 404 can be called the distal rib as rib 404 is the most distal rib relative to sidewall 220. Channel 320 is the channel 300 that is the furthest from the sidewall 120 of the first piece 150. This channel 320 may be called the distal channel as channel 320 is the most distal channel relative to sidewall 120. Assembling adjustable device 100 with distal rib 404 in distal channel 304 will lead to an adjustable device 100 with the largest possible width for that adjustable device 100. Conversely, assembling adjustable device 100 with the distal rib in proximal channel 304 of first piece 150 will lead to an adjustable device 100 with the smallest possible width for that adjustable device 100.

FIG. 2 includes locking ridge 350. Locking ridge 350 engages with a locking trench 450 (not shown here) that is on the back side 208 of second piece 250. The locking ridge 350 and locking trench 450 form an interference fit so that the set of ribs 400 are not moved out of the tops of the set of channels 300 absent the application of an intentional force to overcome the interference fit and dislodge locking ridge 350 from locking trench 450. Those of skill in the art will appreciate that one could design an adjustable device 100 without the locking ridge 350 and locking trench 450 if the risk of unintended disengagement of the ribs 400 from the channels 300 was small (such as when the ribs 400 and channels 300 are very long or the friction between the ribs 400 and channels 300 was fairly large). Alternatively, there are other ways to lock an assembly so that it cannot be disassembled as is known in the art.

Figure 3:
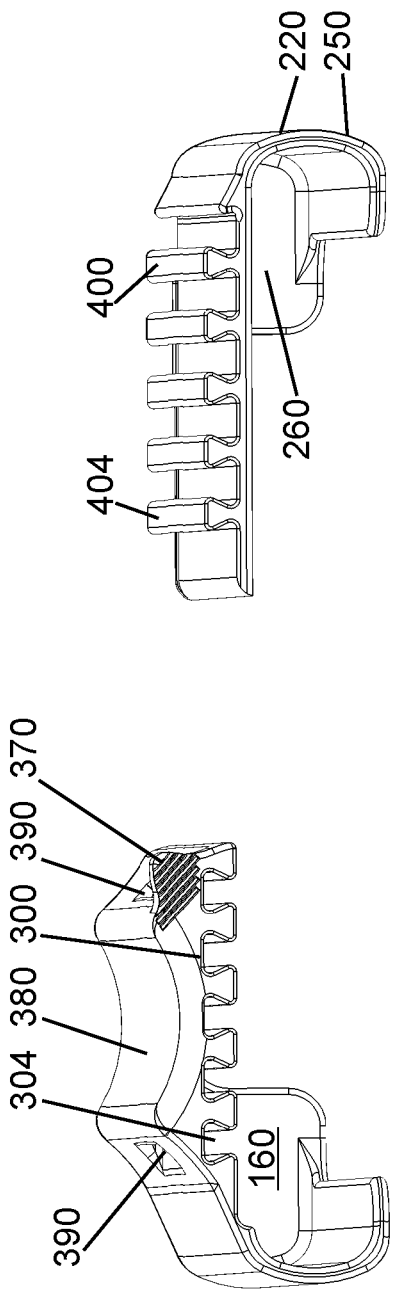
FIG. 3 is a top, left, rear perspective view of first piece 150 and second piece 250 before engagement.

FIG. 3 is a top, left, rear perspective view of first piece 150 and second piece 250 before engagement. The channels 300 have channel bottoms 360 (FIG. 1) to limit the downward travel of the ribs 400. Partial bottom wall 160 and partial bottom wall 260 are visible in this view. Arc 380 is an optional feature to allow the adjustable device 100 to be strapped to a cylindrical item such as commonly found above deck on boats. The first piece 150 may have one or more interior channels 390 to receive a locking strap or a cable tie (also known as a tie wrap). Thus the one or more channels in the first piece 150 are engaged with the cylindrical item to affix the adjustable device 100 to the cylindrical item. Arc 380 may have a malleable liner (not shown here) to allow the adjustable device 100 to be tightly attached to a cylinder and not rattle. Optional, protrusion 370 provides a place to apply force to move the first piece 150 relative to the second piece 250.

Figure 4:
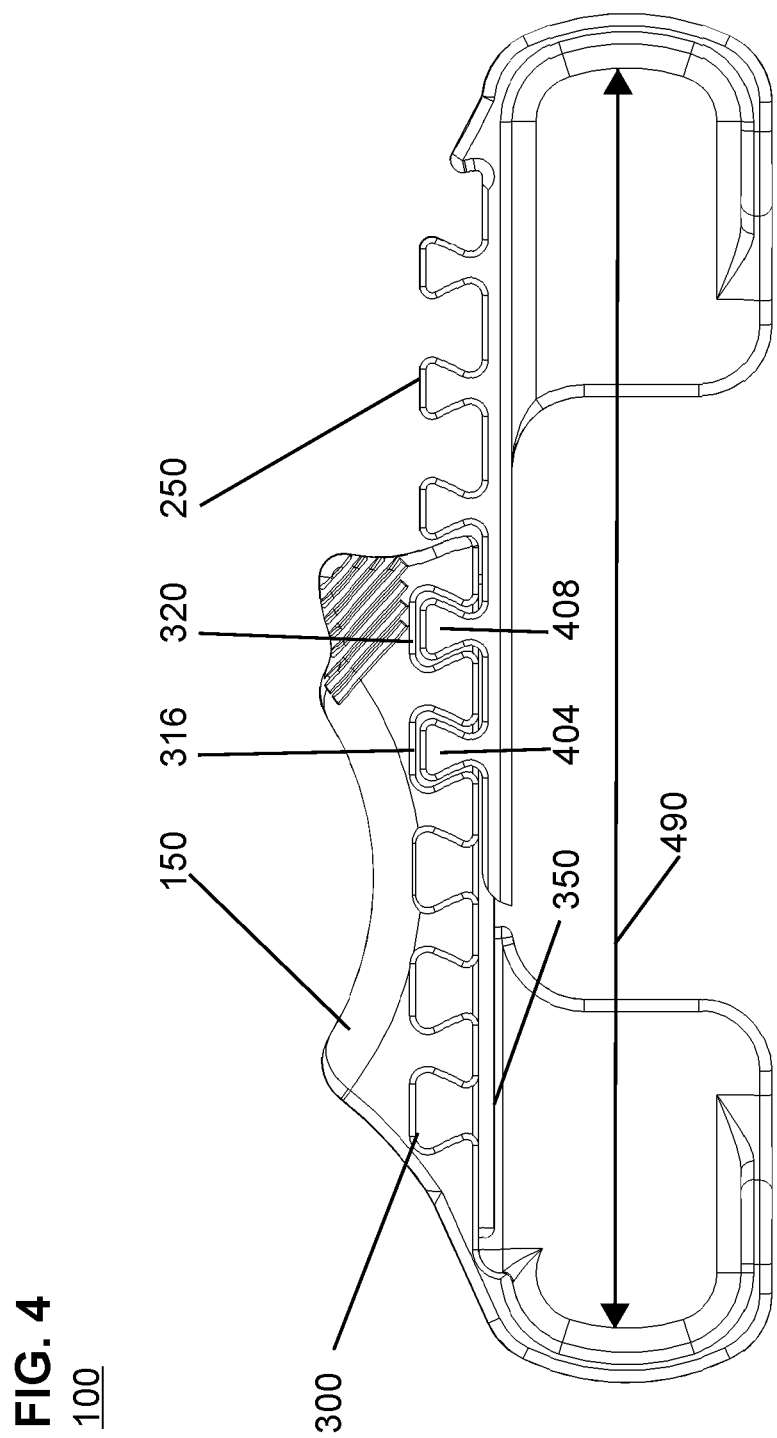
FIG. 4 is a top plan view of adjustable device 100 with the first piece 150 engaged with the second piece 250 as rib 404 is engaged with channel 316 and rib 408 is engaged with channel 320.

FIG. 4 is a top plan view of adjustable device 100 with the first piece 150 engaged with the second piece 250 as rib 404 is engaged with channel 316 and rib 408 is engaged with channel 320. When just two of the ribs (rib 404 and rib 408) are engaged with channels 300, then adjustable device 100 can receive an object with a width of 490. A portion of locking ridge 350 is also visible in FIG. 4.

Figure 5:
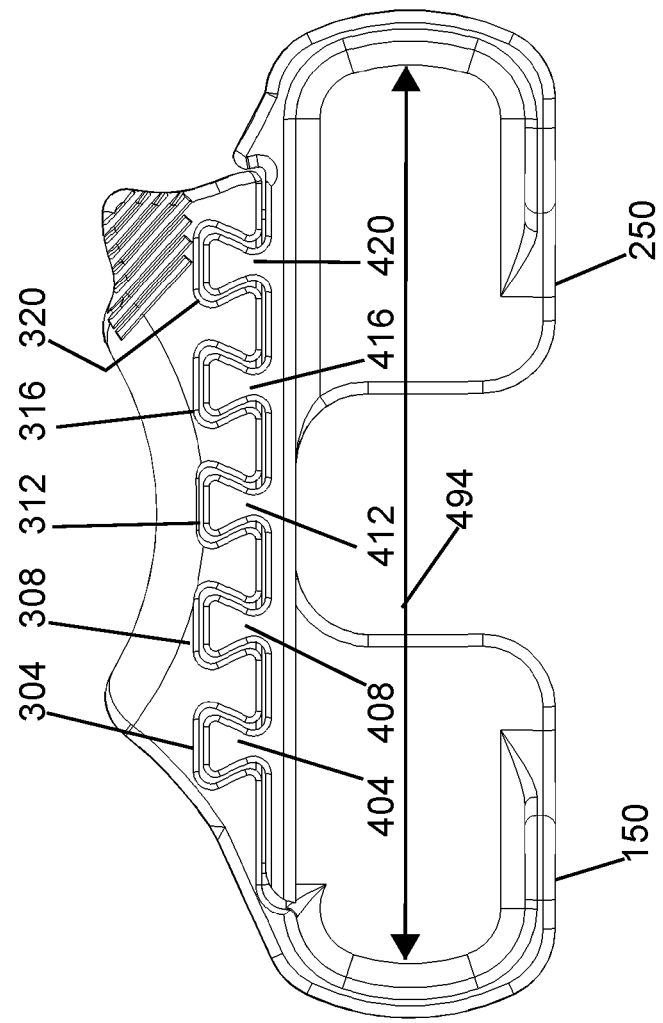
FIG. 5 is another top plan view of adjustable device 100 with first piece 150 engaged with second piece 250 as rib 404 is all the way over into first channel 304 and the corresponding ribs (408, 412, 416, and 420) are engaged with channels (308, 312, 316, and 320).

FIG. 5 is another top plan view of adjustable device 100 with first piece 150 engaged with second piece 250 as rib 404 is all the way over into first channel 304 and the corresponding ribs (408, 412, 416, and 420) are engaged with channels (308, 312, 316, and 320). The adjustable device 100 as assembled will accommodate an object with a width of 494 but not a device of larger width 490 (as shown in FIG. 4).

Figure 6:
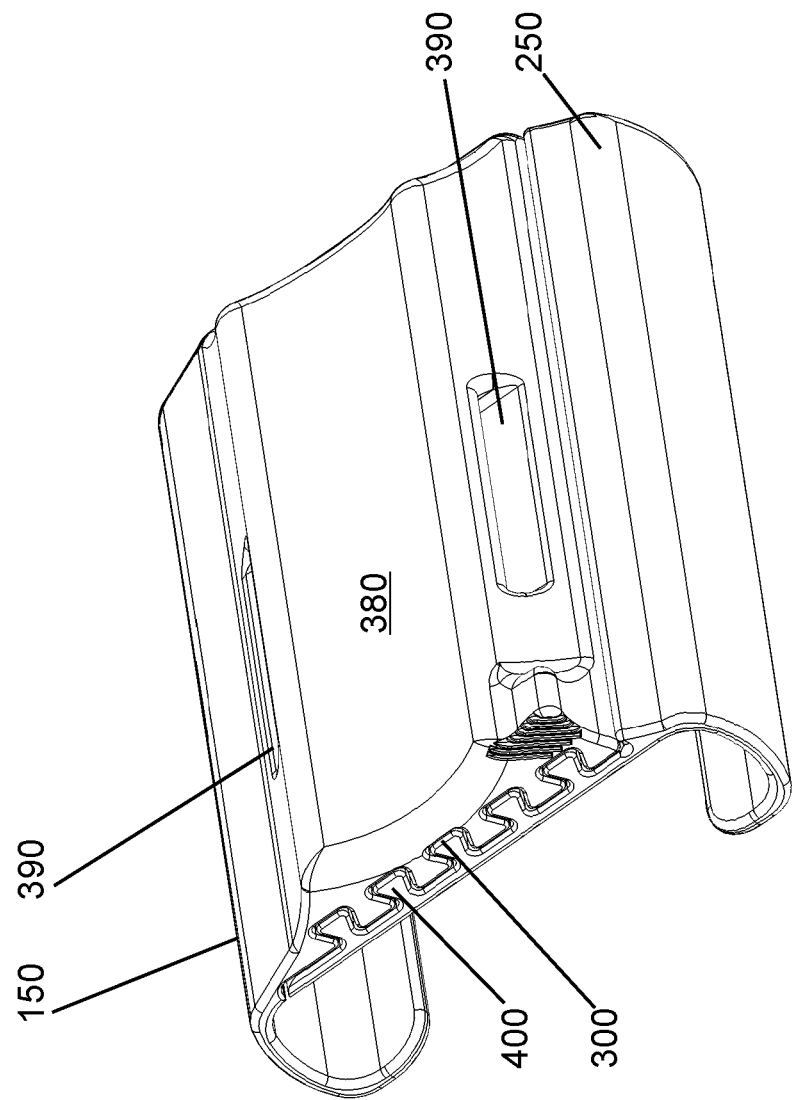
FIG. 6 is a top, rear, left side perspective view of adjustable device 100 as shown in FIG. 5 with maximum engagement of ribs 400 in channels 300 and thus minimal width 394 (FIG. 5).

FIG. 6 is a top, rear, left side perspective view of adjustable device 100 as shown in FIG. 5 with maximum engagement of ribs 400 in channels 300 and thus minimal width 394 (FIG. 5). This view shows interior channel 390 for receipt of a strap or other securing device to affix the adjustable device 100 to a cylindrical object at arc 380.

Figure 7:
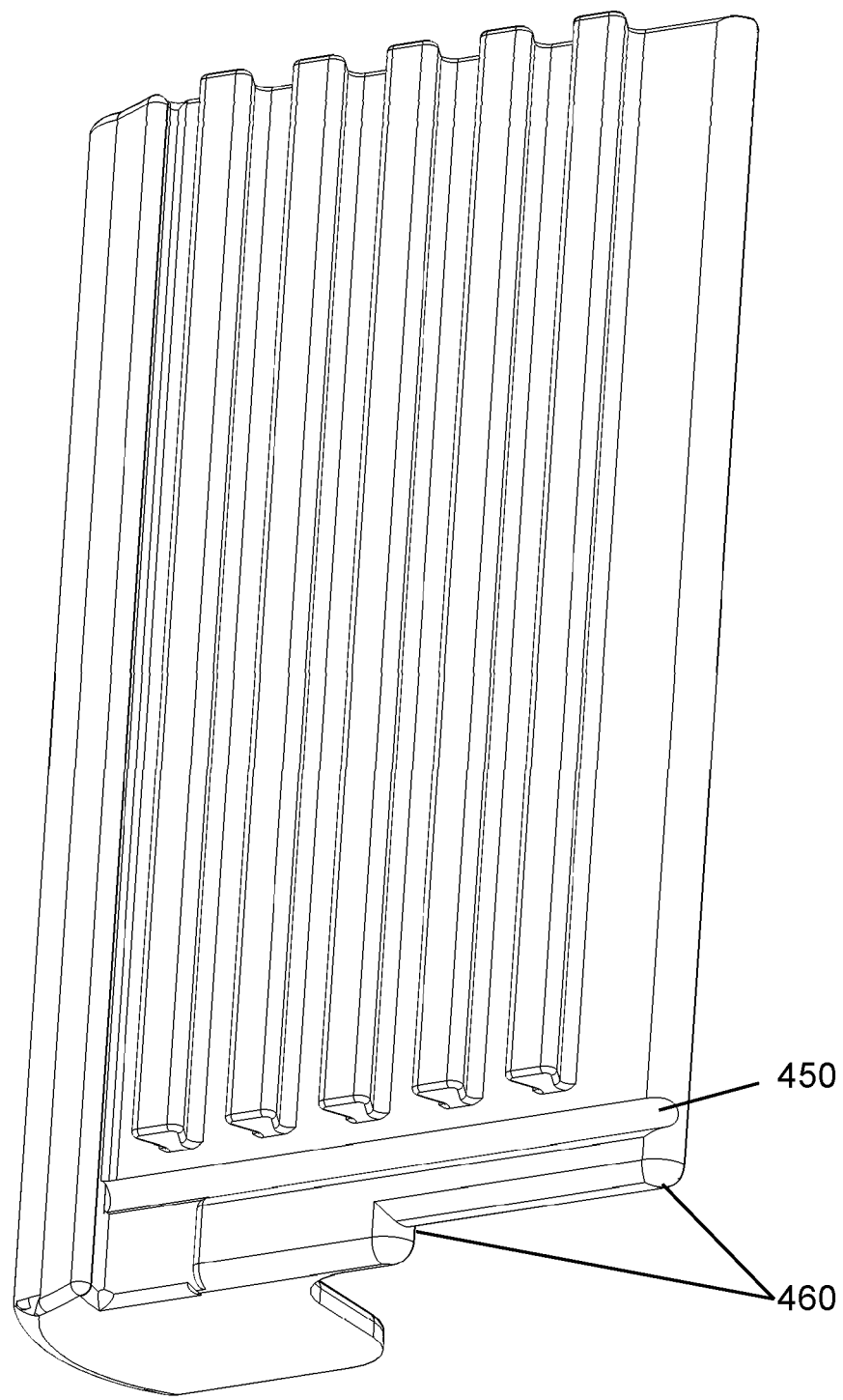
FIG. 7 is a rear, bottom, left perspective view of second piece 250.

FIG. 7 is a rear, bottom, left perspective view of second piece 250. This view shows the locking trench 450 that receives at least a portion of locking ridge 350 (FIG. 2) of first piece 150 (FIG. 2). The interaction of the locking ridge 350 and locking trench 450 requires added force to elastically distort the adjustable device 100 so that at least a portion of the locking ridge 350 can be dropped into locking trench 450 as first piece 150 becomes fully engaged with second piece 250. A second level of added force is needed to overcome the interference fit of the locking ridge 350 in locking trench 450 in order to disengage first piece 150 from second piece 250. This interference fit and the related extra force needed to evoke a change helps prevent unintended disengagement of first piece 150 from second piece 250.

Also visible in FIG. 7 is reduced wall section 460 (also visible in FIG. 2). Reduced wall section 460 allows the second piece 250 to be positioned over the partial bottom wall 160 (FIG. 2) of the first piece 150 (FIG. 2)

Process of Use

Figure 8B:
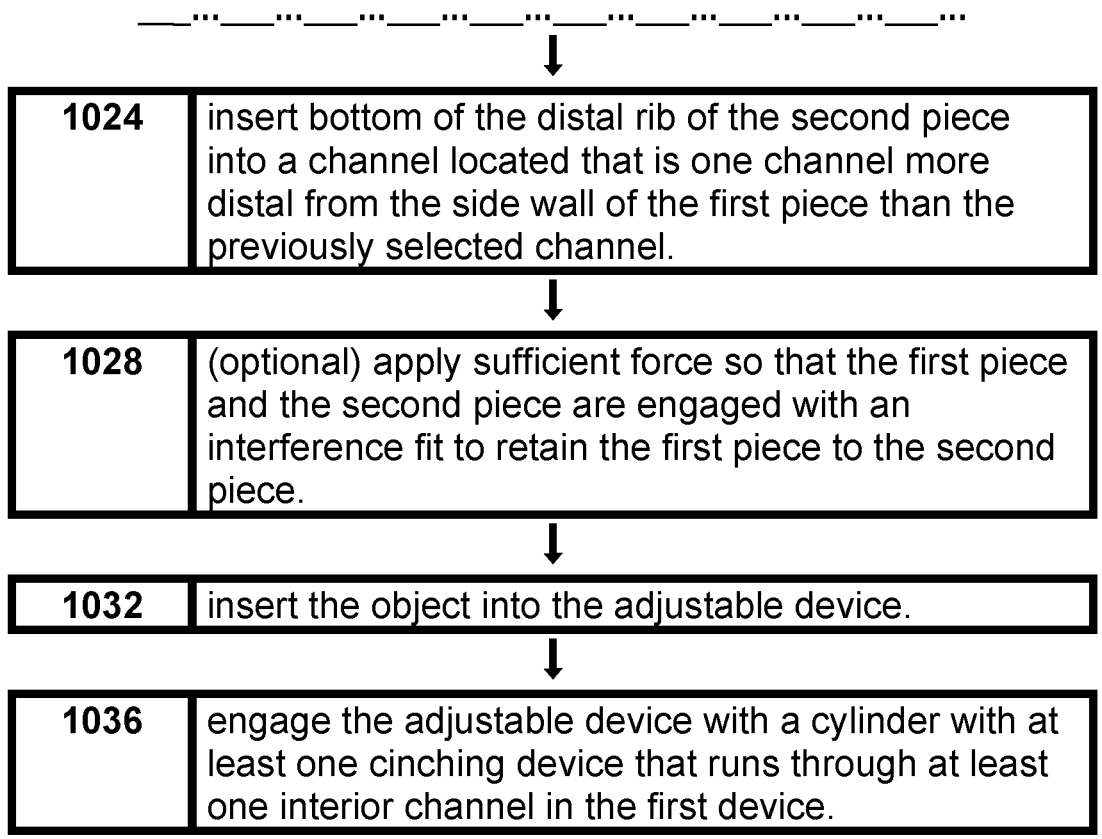
FIG. 8 is a flowchart for a process 1000 for mounting an object within an adjustable device that can be affixed to a cylinder.

FIG. 8 is a flowchart for a process 1000 for mounting an object within an adjustable device that can be affixed to a cylinder.

Step 1004 obtain first piece with a set of channels and second piece with a set of ribs that may be top loaded into the channels.

Step 1008 insert bottom of the distal rib of the second piece into a channel located between the proximal channel closest to the sidewall of the first piece and the distal channel furthest from the sidewall of the first piece.

Step 1012 (optional) apply sufficient force so that the first piece and the second piece are engaged with an interference fit to retain the first piece to the second piece. This step is optional in that the adjustable device may not have included components that force the interference fit. For a particular adjustable device this step is either required or not required.

Step 1016 attempt to insert the object into the assembled adjustable device but find that the width of the object is slightly larger than the interior width between the sidewall on the first piece and the sidewall on the second piece.

Step 1020 (optional) apply sufficient force so that the first piece and the second piece are disengaged from the interference fit to retain the first piece to the second piece.

Step 1024 insert bottom of the distal rib of the second piece into a channel located that is one channel more distal from the side wall of the first piece than the previously selected channel.

Step 1028 (optional) apply sufficient force so that the first piece and the second piece are engaged with an interference fit to retain the first piece to the second piece.

Step 1032 insert the object into the adjustable device.

Step 1036 engage the adjustable device with a cylinder with at least one cinching device that runs through at least one interior channel in the first device.

Those of skill in the art will appreciate that for an adjustable device that is designed to have the ribs side loaded into the channels, that the process would be adapted accordingly. The adjustable device may be optimized to the attached to something other than a cylinder but a cylinder is common in many vehicles such as ocean going boats.

No Risk of Rust.

One of skill in the art will appreciate that the teachings of the present disclosure may be implemented using polymers whether by an additive manufacturing process sometimes known as 3D printing or by other manufacturing processes.

An adjustable device 100 that is made without any metallic elements would be well-suited for a use that exposes the adjustable device to water and especially well-suited for use on a vehicle exposed to salt water. Oxidation from salt exposure will not cause premature failure of components and will not cause components to fuse together so that they are difficult to disassociate.

Alternatives and Variations.

Solid Walls not Required.

The drawings have shown an embodiment that has side wall 120 and side wall 220 that are solid. Likewise the drawing has shown partial bottom wall 160 and partial bottom wall 260 as solid. One of skill in the art will appreciate that as long as these walls retain the object, that these walls may have one or more openings. The openings may be used to allow ventilation to promote cooling of an electrical object, or to allow drainage of water that might enter the adjustable device 100 from the top or front. The openings may be positioned to allow for a wire to access the object to provide power or data. The opening may be useful to leave a microphone or a speaker uncovered.

Objects do not have to be Electronic.

The retained object will often be an electronic device with a display screen but this is not a requirement of the disclosure. One could mount a framed picture of a spouse or significant other in the adjustable device if that was desired. One could mount something that needs to be in a known visible place in the adjustable device such as a first aid kit or a repair kit. The open front of the adjustable device will allow a user to immediately know if the desired item is not present in the adjustable device.

Retained Object not Necessarily Visible.

While a common use case is to have an adjustable device 100 holding a retained object so that a forward-facing screen on the retained object is visible, this is not a requirement of the present disclosure. The adjustable device 100 could be affixed within a cabin, locker, or cabinet and not visible unless doors are opened.

Cinching Devices and Interior Channels.

A cinching device to allow the adjustable device 100 to be pulled snug to a cylinder may be a belt analogous to a woven belt used with pants. The cinching device may be a belt that uses hook and loop fasteners such as sold by Velcro Companies. The cinching device may be a cable tie (sometimes called a zip tie or tie wrap). One of skill in the art will appreciate that when using thin cinching devices, it may be advantageous to have several interior channels and thus use several cinching devices.

May Attach to a Cylinder that is not Substantially Vertical.

Designers may offer adjustable devices 100 with an arc 380 that is not oriented to receive a portion of a vertical cylinder but is instead oriented to allow the adjustable device 100 to be strapped to a substantially horizontal cylinder and still allow the adjustable device 100 to be top loaded. Other adjustable devices 100 may have an arc 380 that is oriented at another common orientation of cylinders such as positive 45 degrees or negative 45 degrees so that the adjustable device 100 could engage a cylinder and still allow for top loading of the adjustable device 100.

Not Required to Strap to a Cylindrical Item.

The drawings showed an arc 380 and a set of one or more interior channels 390 to allow the adjustable device 100 to be retained to a cylinder as this is a common use for the adjustable device when used on a boat. Thus the arc 380 is optional as it is an adaptation for use with substantially vertical or substantially horizontal cylinder.

The teachings of the present disclosure may be used for an adjustable device 100 that is connected to a vehicle through other connection types. There are many reversible ways to attach one device to a wall or other vertical surface including placing screws into the wall so that the screw head can engage with a tear drop shape in the wall side of the adjustable device. Alternatively, the first piece may be adhered to the wall using adhesives, nails, screws, or other techniques.

Top Loading not Required.

While the example discussed in this disclosure was an adjustable device 100 that was top loaded with the retained object, this is not a requirement. For certain use cases, it may be acceptable to have an adjustable device 100 that is side loaded. One of skill in the art with appreciate that the sidewalls of the first piece and the second piece will not be substantially vertical in such a use but will instead be substantially horizontal with one sidewall forming a bottom wall and one sidewall forming a top wall. The partial bottom walls of the drawings discussed in this disclosure will form one sidewall and the other sidewall will be open to allow for loading.

Alternatives to Dovetail.

Those of skill in the art will appreciate that while the ribs 400 and channels 300 shown in the figures discussed above used a dovetail shape that this is not required. Many other shapes that are suitable are known in cabinet making. Examples of suitable arrays of ribs and channels include These examples share the required characteristics of allowing a top loading of a set of ribs into a set of channels so that after loading, the ribs cannot move in any direction except to be removed from the channels by reversing the top loading. Note, de minimus movements may be possible as the ribs may be smaller than the channels but the ribs are essentially constrained against any substantial movement until removed from the channel from the top of the channel.

Figure 9:
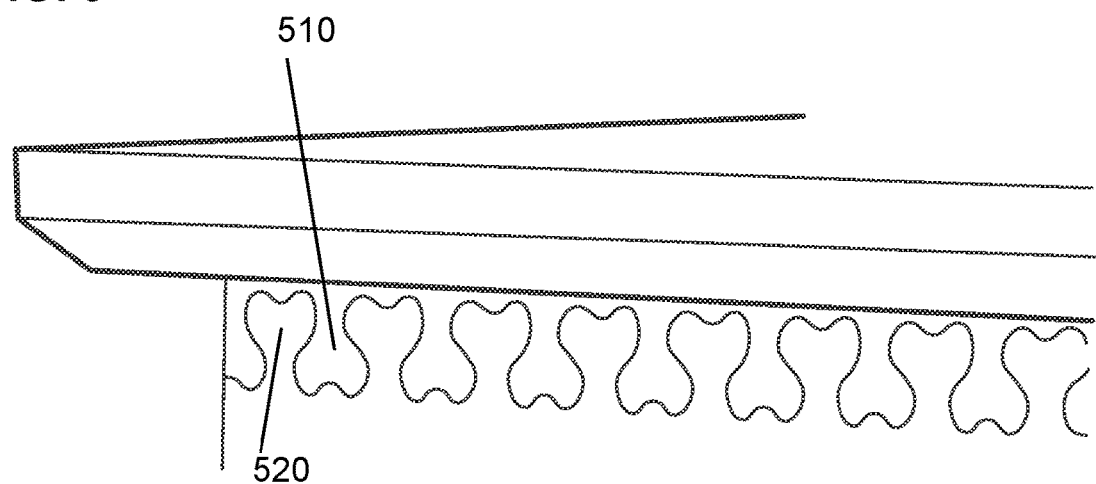
FIG. 9 shows an alternative rib and channel arrangement where the channels 510 and the ribs 520 are symmetric so that one could deem 510 to be the rib and 520 to be the channel.
Figure 10:
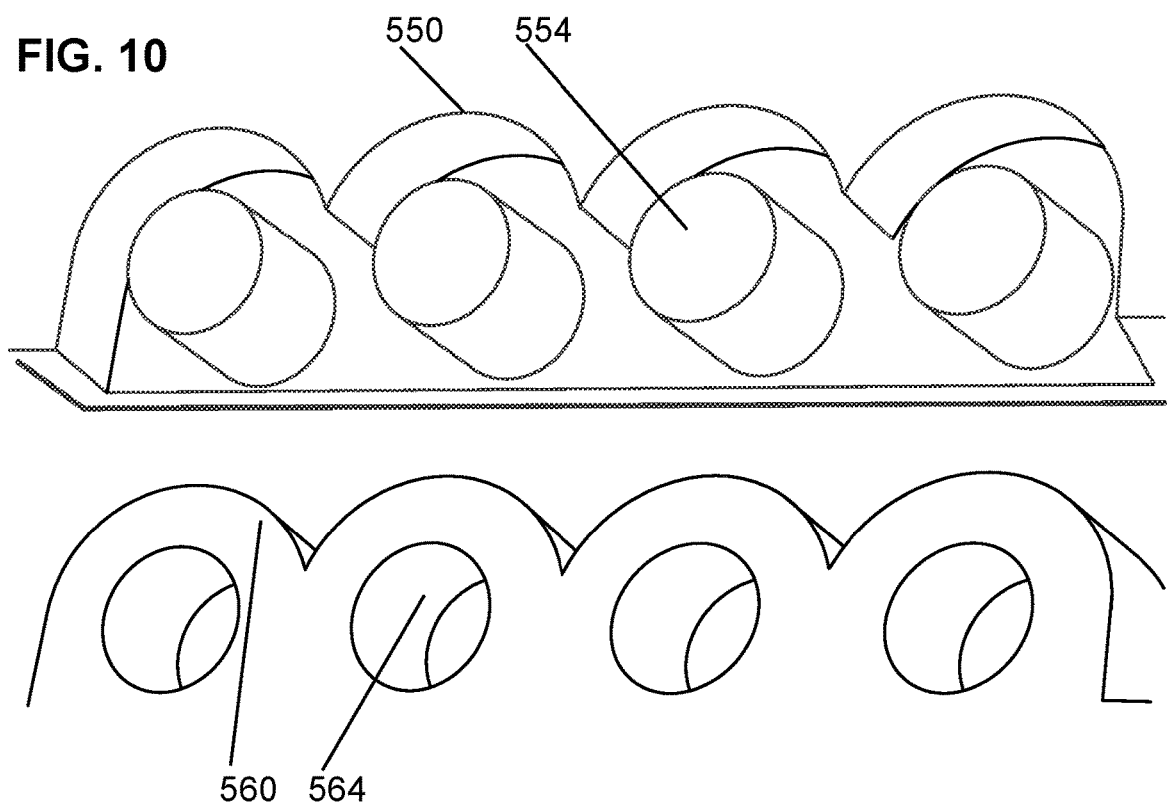
FIG. 10 shows another alternative rib and channel arrangement.

While there are many possible examples of ribs and channels, it may be helpful to look at FIG. 9 and FIG. 10. FIG. 9 shows an alternative rib and channel arrangement where the channels 510 and the ribs 520 are symmetric so that one could deem 510 to be the rib and 520 to be the channel. For purposes of this disclosure, FIG. 9 meets the need for a set of channels and a set of ribs that can be placed into the channels for retention within the channel except for reversing the direction of loading.

FIG. 10 shows another alternative rib and channel arrangement. In FIG. 10, the rib 560 is retained in channel 550 by the insertion of cylinder 554 into circular opening 564. FIG. 9 and FIG. 10 are taken from the art of cabinet making where repeated patterns are used in order to simplify the process of joining one piece to another but the norm is that all ribs and channels are used and there is no consideration of varying the mapping of ribs to channels.

As indicated by FIG. 9 and FIG. 10, the concept of rib and channel should be interpreted broadly to include a first pattern on a first piece that may be retained by a second pattern in a second piece but allows for the two patterns to engage with different ribs inserted into different channels so as to allow for a variety of widths of the assembled adjustable device.

Heights of Ribs and Channels.

The figures have shown an adjustable device 100 with a set of ribs 400 and a set of channels 300 that run most of the height of the first piece 150 and the second piece 250. While this is a good choice, it is not a requirement as a set of ribs 400 and a set of channels 300 that are a smaller fraction of the height of the first piece 150 and the second piece 250 would provide sufficient rigidity, especially when at least two ribs 400 are engaged with channels 300.

Number of Ribs Does not Have to Match Number of Channels.

Those of skill in the art will appreciate that second piece 250 could be formed with just distal rib 404 or possibly just ribs 404 and 408. The additional ribs provide for added strength when used in a narrow configuration of adjustable device 100 but are not required.

One Type of Rib and One Type of Channel.

Those of skill in the art will appreciate that a design of a series of identical ribs 400 and identical channels 300 will provide the maximum option for small changes in width of the adjustable device 100. However, in some situations, one may be able to live with having a pattern of channels that alternate between Shape A and Shape B. There would need to be corresponding ribs of Shape A and Shape B. Then when there is a desire to expand the width of adjustable device 100, the choice is not moving rib shape A to the next channel but moving rib shape A to a channel two positions from the current channel. All the of the A shaped ribs would go into A shaped channels and all of the B shaped ribs would go into B shaped channels.

One of skill in the art will appreciate that there could be three or more shapes of ribs and channels but that reduces that number of options for width choices for the adjustable device.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

Where methods and/or events described above indicate certain events and/or procedures occurring in a certain order, the ordering of certain events and/or procedures may be modified. Additionally, certain events and/or procedures may be performed concurrently in a parallel process, when possible, as well as performed sequentially as described above.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. An adjustable device comprising:
   a first piece with:
   a first sidewall;
   a first partial front wall;
   a first partial bottom wall; and
   a set of at least three channels, with each channel shaped to receive a corresponding rib;
   a second piece with:
   a second sidewall;
   a second partial front wall;
   a second partial bottom wall; and
   a distal rib adapted to load into at least three different channels on the first piece; and
   the distal rib may be loaded into a selected channel chosen from the at least three different channels on the first piece and retained within the selected channel until the distal rib is withdrawn from the selected channel so that a maximum width of an object inserted between the first sidewall and the second sidewall of the adjustable device is a function of a choice of the selected channel.

2. The adjustable device of claim 1 wherein the distal rib is part of a set of at least two ribs.

3. The adjustable device of claim 1 wherein the distal rib has a dovetail shape.

4. The adjustable device of claim 1 wherein the distal rib does not have a dovetail shape.

5. The adjustable device of claim 1 wherein the set of at least three channels are open at a top side of the adjustable device when the adjustable device is mounted in an intended orientation.

6. The adjustable device of claim 1 wherein the first piece has a concavity on a back wall to allow the adjustable device to partially encircle a cylindrical object.

7. The adjustable device of claim 6 wherein the cylindrical object to be partially encircled is oriented substantially parallel to the first sidewall.

8. The adjustable device of claim 6 wherein the cylindrical object to be partially encircled is not oriented substantially parallel to the first sidewall.

9. The adjustable device of claim 1 wherein the first piece has at least one interior channel that may be used with a cinching device to secure the adjustable device to a structure.

10. The adjustable device of claim 9 wherein an intended orientation of the adjustable device after being secured to the structure places the first sidewall in a vertical position so that the object can be top loaded into the adjustable device.

11. The adjustable device of claim 9 wherein an intended orientation of the adjustable device after being secured to the structure places the first sidewall in a horizontal position so that the object can be side loaded into the adjustable device.

12. The adjustable device of claim 1 wherein the second piece has a second rib that has a shape different than the distal rib and the first piece has a pattern of channels of a first type that may receive the distal rib and channels of a second type that may receive the second rib so that the distal rib may be loaded into the selected channel chosen from the at least three different channels of the first type on the first piece and retained within the selected channel until the distal rib is withdrawn from the selected channel and the second rib may be simultaneously loaded into a channel of the second type so that the maximum width of the object inserted between the first sidewall and the second sidewall of the adjustable device is the function of the choice of the selected channel.

13. The adjustable device of claim 1 wherein the first piece and the second piece are both made of materials that do not rust.

14. The adjustable device of claim 1 further comprising a locking ridge on the first piece that engages with a locking trench on the second piece to require an elevated level of force to disengage the first piece from the second piece.

15. The adjustable device of claim 1 wherein the first sidewall is on a left side when viewing a front of the adjustable device.

16. The adjustable device of claim 1 wherein the first sidewall is on a right side when viewing a front of the adjustable device.

17. The adjustable device of claim 1 wherein the adjustable device is adapted to have the object loaded into the adjustable device so that the object is retained within the adjustable device and a screen on the object may be viewed while the object is retained within the adjustable device.

18. A process for changing a width of an adjustable device, the process comprising:
   obtaining a first piece with a set of at least three channels sized to receive a distal rib;
   obtaining a second piece with the distal rib;
   loading the distal rib into a first channel sized to receive the distal rib to form an assembled adjustable device with a first width between a first sidewall on the first piece and a second sidewall on the second piece;
   choosing to increase a distance between the first sidewall on the first piece and the second sidewall on the second piece;
   removing the distal rib from the first channel sized to receive the distal rib;
   selecting a second channel sized to receive the distal rib where the second channel is not the first channel and the second channel is further from the first sidewall; and
   loading the distal rib into the second channel sized to receive the distal rib to form the assembled adjustable device with a second width between the first sidewall on the first piece and the second sidewall on the second piece wherein the second width is larger than the first width.

19. The process of claim 18 wherein:
   loading the distal rib in the first channel sized to receive the distal rib requires applying first force sufficient to engage the first piece with the second piece in an interference fit; and
   removing the distal rib from the first channel sized to receive the distal rib requires applying second force sufficient to disengage interference fit involving the first piece and the second piece.

20. The process of claim 18 further comprising affixing the assembled adjustable device with the second width between the first sidewall on the first piece and the second sidewall on the second piece to a structural element on a vehicle through use of at least one cinching device that runs through at least one interior channel in the first piece.

* * * * *